United States Patent
Govindappa et al.

(10) Patent No.: US 11,544,446 B2
(45) Date of Patent: Jan. 3, 2023

(54) SUPPORT HIERARCHICAL DISTRIBUTION OF DOCUMENT OBJECTS

(71) Applicant: SAP SE, Walldorf (DE)

(72) Inventors: Prasanna Kumar Govindappa, Bangalore (IN); Debashis Banerjee, Bengaluru (IN); Hari Babu Krishnan, Bangalore (IN); Shruthi Jinadatta, Bangalore (IN); Santhosh Krishnamurthy, Bengaluru (IN); Sagar Mullanghi, Bangalore (IN)

(73) Assignee: SAP SE, Walldorf (DE)

( * ) Notice: Subject to any disclaimer, the term of this patent is extended or adjusted under 35 U.S.C. 154(b) by 1071 days.

(21) Appl. No.: 16/203,896

(22) Filed: Nov. 29, 2018

(65) Prior Publication Data
US 2020/0175097 A1   Jun. 4, 2020

(51) Int. Cl.
| | | |
|---|---|---|
| *G06F 40/14* | (2020.01) | |
| *G06F 16/93* | (2019.01) | |
| *G06F 40/137* | (2020.01) | |
| *G06F 16/9537* | (2019.01) | |
| *G06F 40/103* | (2020.01) | |
| *G06F 40/177* | (2020.01) | |

(52) U.S. Cl.
CPC ............ *G06F 40/14* (2020.01); *G06F 16/93* (2019.01); *G06F 16/9537* (2019.01); *G06F 40/103* (2020.01); *G06F 40/137* (2020.01); *G06F 40/177* (2020.01)

(58) Field of Classification Search
None
See application file for complete search history.

(56) References Cited

U.S. PATENT DOCUMENTS

| | | | | |
|---|---|---|---|---|
| 5,842,218 A | * | 11/1998 | Robinson | G06F 16/26 |
| | | | | 707/999.102 |
| 6,526,399 B1 | * | 2/2003 | Coulson | G06F 16/26 |
| 6,628,312 B1 | * | 9/2003 | Rao | G06F 40/177 |
| | | | | 715/713 |
| 6,850,900 B1 | * | 2/2005 | Hare | G06Q 40/04 |
| | | | | 705/26.8 |

(Continued)

*Primary Examiner* — Benjamin Smith
(74) *Attorney, Agent, or Firm* — Buckley, Maschoff & Talwalkar LLC

(57) ABSTRACT

According to some embodiments, methods and systems may include a data storage device that contains document files associated with a plurality of document line objects with attributes, the attributes including item terms and conditions. An object exchange platform processor may receive input values for a selected document line object with attributes and determine that the selected document line object contains multiple object sets. The processor may then create, for each object set, a separate executable outline document having an outline document identifier. The processor may also arrange to establish the plurality of executable outline documents at a remote external central component platform. According to some embodiments, objects within the selected document line object have a hierarchical structure such that some objects are sub-items of other objects. Moreover, attributes of the objects within the selected document line object may be distributable and configurable in accordance with the hierarchical structure.

13 Claims, 11 Drawing Sheets

(56) References Cited

U.S. PATENT DOCUMENTS

| | | | |
|---|---|---|---|
| 7,200,605 B2* | 4/2007 | Baker | G06Q 10/10 |
| | | | 707/999.102 |
| 7,308,410 B2* | 12/2007 | Bowe, Jr. | G06Q 30/012 |
| | | | 715/764 |
| 8,108,241 B2* | 1/2012 | Shukoor | G06Q 10/06 |
| | | | 705/7.38 |
| 8,160,905 B2* | 4/2012 | Lesswing | G06Q 10/10 |
| | | | 705/37 |
| 9,436,672 B2* | 9/2016 | Greenwood | G06F 40/14 |
| 9,792,277 B2* | 10/2017 | Srinivasan | G06F 40/30 |
| 10,083,479 B2* | 9/2018 | Zavar | G06Q 30/0641 |
| 10,445,698 B2* | 10/2019 | Hunn | G06Q 10/10 |
| 10,460,162 B2* | 10/2019 | Gelosi | G06F 40/166 |
| 10,776,868 B2* | 9/2020 | Singer | G06Q 40/04 |
| 10,861,101 B1* | 12/2020 | Harding | G06Q 10/06315 |
| 11,074,650 B1* | 7/2021 | Madisetti | H04L 9/3239 |
| 11,182,371 B2* | 11/2021 | Gao | G06F 16/2282 |
| 11,222,331 B2* | 1/2022 | Madisetti | G06Q 40/04 |
| 2003/0046261 A1* | 3/2003 | Baker | G06Q 10/10 |
| 2004/0133581 A1* | 7/2004 | Shinjo | G06F 16/258 |
| 2007/0157079 A1* | 7/2007 | Baker | G06Q 10/10 |
| | | | 707/999.001 |
| 2007/0225986 A1* | 9/2007 | Bowe, Jr. | G06Q 30/012 |
| | | | 705/1.1 |
| 2007/0265962 A1* | 11/2007 | Bowe, Jr. | G06Q 20/102 |
| | | | 705/40 |
| 2008/0033777 A1* | 2/2008 | Shukoor | G06Q 10/06 |
| | | | 705/7.11 |
| 2008/0270149 A1* | 10/2008 | Cirulli | G06Q 10/0631 |
| | | | 705/1.1 |
| 2010/0010842 A1* | 1/2010 | Bank | G06Q 30/06 |
| | | | 707/694 |
| 2012/0303645 A1* | 11/2012 | Kulkarni-Puranik | G06F 40/18 |
| | | | 707/756 |
| 2014/0006240 A1* | 1/2014 | Haas | G06Q 10/10 |
| | | | 705/35 |
| 2015/0120738 A1* | 4/2015 | Srinivasan | G06F 16/285 |
| | | | 707/739 |
| 2015/0186352 A1* | 7/2015 | Greenwood | G06F 40/14 |
| | | | 715/217 |
| 2016/0188568 A1* | 6/2016 | Srinivasan | G06F 40/30 |
| | | | 704/9 |
| 2016/0275607 A1* | 9/2016 | Singer | G06Q 40/04 |
| 2016/0357408 A1* | 12/2016 | Zavar | G06Q 30/0603 |
| 2017/0091166 A1* | 3/2017 | Greenwood | G06F 40/103 |
| 2018/0005186 A1* | 1/2018 | Hunn | G06F 16/93 |
| 2019/0114479 A1* | 4/2019 | Gelosi | G06V 30/414 |
| 2019/0171703 A1* | 6/2019 | Evans | G06F 40/186 |
| 2019/0325047 A1* | 10/2019 | Gao | G06F 16/2379 |
| 2020/0057994 A1* | 2/2020 | Hunn | G06F 21/645 |
| 2020/0175097 A1* | 6/2020 | Govindappa | G06F 40/137 |
| 2021/0049061 A1* | 2/2021 | Xu | G06F 11/0757 |
| 2021/0287288 A1* | 9/2021 | Madisetti | G06Q 20/0658 |
| 2021/0374672 A1* | 12/2021 | Hunn | H04L 9/50 |
| 2021/0406264 A1* | 12/2021 | Nahamoo | G06F 16/3349 |

* cited by examiner

SUPPORT HIERARCHICAL DISTRIBUTION OF DOCUMENT OBJECTS

BACKGROUND

An enterprise may utilize an object exchange platform. For example, the enterprise might establish a document line object with attributes, and the document line object may include have items with a hierarchical structure such that some objects are sub-objects of other objects. In some cases, the enterprise might want to establish a number of executable outline documents at a remote external central component platform based on such a document line object. Typically, only a single executable outline document can be established per document line object. This may force the enterprise to create a substantial number of document line objects, which can be a time-consuming, expensive, and error prone process. For example, a simple change to an attribute may need to be manually replicated across a large number of document line objects (e.g., potentially hundreds of related document line objects. It would therefore be desirable to provide for the creation of multiple executable outline documents based on a single document line item in a fast, automatic, and accurate manner.

SUMMARY

According to some embodiments, methods and systems may include a data storage device that contains document files associated with a plurality of document line objects with attributes, the attributes including item terms and conditions. An object exchange platform processor may receive input values for a selected document line object with attributes and determine that the selected document line object contains multiple object sets. The processor may then create, for each object set, a separate executable outline document having an outline document identifier. The processor may also arrange to establish the plurality of executable outline documents at a remote external central component platform. According to some embodiments, objects within the selected document line object have a hierarchical structure such that some objects are sub-items of other objects. Moreover, attributes of the objects within the selected document line object may be distributable and configurable in accordance with the hierarchical structure.

Some embodiments comprise: means for receiving, by a processor of an object exchange platform, input values for a selected document line object with attributes from a data storage device containing document files associated with a plurality of document line objects with attributes, the attributes including object terms and conditions; means for determining, by the processor, that the selected document line object contains multiple object sets; means for creating, by the processor for each object set, a separate executable outline document having an outline document identifier; and means for arranging, by the processor, to establish the plurality of executable outline documents at a remote external central component platform.

Some technical advantages of some embodiments disclosed herein are improved systems and methods to provide for the creation of multiple executable outline documents based on a single document line item in a fast, automatic, and accurate manner.

DETAILED DESCRIPTION

In the following detailed description, numerous specific details are set forth in order to provide a thorough understanding of embodiments. However, it will be understood by those of ordinary skill in the art that the embodiments may be practiced without these specific details. In other instances, well-known methods, procedures, components and circuits have not been described in detail so as not to obscure the embodiments.

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

In existing systems, creation of only one executable outline document per document line object is supported. It would be desirable to provide for the creation of multiple executable outline documents based on a single document line object in a fast, automatic, and accurate manner. According to some embodiments, a mechanism may be provided where in an enterprise can distribute hierarchical document objects and create as many as outline documents as are needed.

Figure 1:
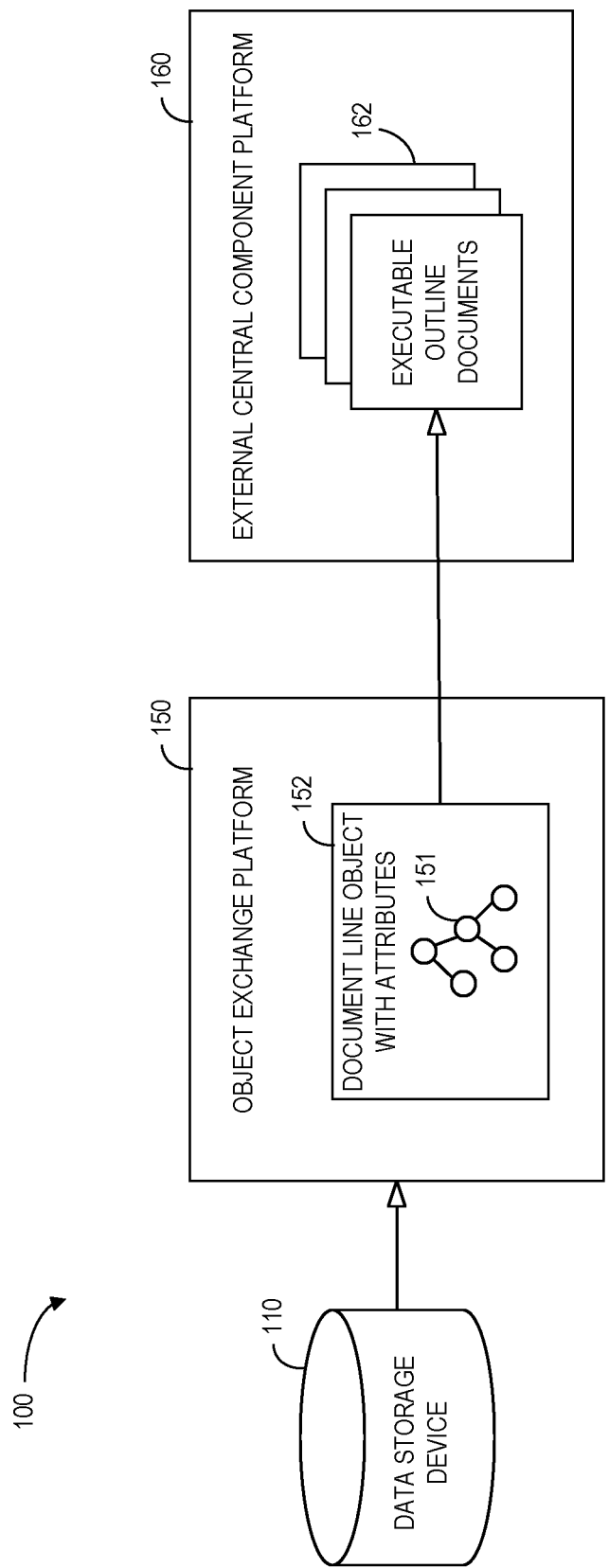
FIG. 1 is a high-level block diagram of a system in accordance with some embodiments.

To achieve such results, FIG. 1 is a high-level block diagram of a system 100 in accordance with some embodiments. The system 100 includes an object exchange platform 150 that access information in a data storage device 110. The object exchange platform 150 might use this information, for example, to create a document line object with attributes 152, including objects with a hierarchical structure 151 such that some objects are sub-objects of other objects. The object exchange platform 150 may be configured to generate multiple executable outline documents 162 at a remote external central component platform 160. The process might be performed automatically or be initiated via a command from a remote operator interface device. As used herein, the term "automatically" may refer to, for example, actions that can be performed with little or no human intervention.

As used herein, devices, including those associated with the system 100 and any other device described herein, may exchange information via any communication network which may be one or more of a Local Area Network ("LAN"), a Metropolitan Area Network ("MAN"), a Wide Area Network ("WAN"), a proprietary network, a Public Switched Telephone Network ("PSTN"), a Wireless Application Protocol ("WAP") network, a Bluetooth network, a wireless LAN network, and/or an Internet Protocol ("IP") network such as the Internet, an intranet, or an extranet. Note that any devices described herein may communicate via one or more such communication networks.

The object exchange platform 150 may store information into and/or retrieve information from various data stores (e.g., the data storage device 110), which may be locally stored or reside remote from the object exchange platform 150. Although a single object exchange platform 150 is shown in FIG. 1, any number of such devices may be included. Moreover, various devices described herein might be combined according to embodiments of the present invention. For example, in some embodiments, the data storage device 110 and the object exchange platform 150 might comprise a single apparatus. The system 100 functions may be performed by a constellation of networked apparatuses, such as in a distributed processing or cloud-based architecture.

A user may access the system 100 via a remote device (e.g., a Personal Computer ("PC"), tablet, or smartphone) to view information about and/or manage operational information in accordance with any of the embodiments described herein. In some cases, an interactive graphical user interface display may let an operator or administrator define and/or adjust certain parameters (e.g., to add objects or adjust attributes of a document line object 152) and/or provide or receive automatically generated recommendations or results from the system 100.

Some embodiments may provide support for distributing the hierarchical objects 151 as follows. An object may be arranged with one or more sub-objects to form a hierarchy, and embodiments may support distribution of hierarchical objects by allowing for the configurability of a number of distributable attributes (e.g., attributes that may need to be grouped might not be fixed and can be configurable based on the needs of an enterprise). Embodiments may also support an unlimited number of levels the object hierarchy (that is, there is no limitation to the number of levels in the tree, although hardware may need to be scaled as appropriate). Embodiments may also provide for a flexible split of objects within and across the hierarchy of objects 152 (e.g., objects to be grouped to create an outline document might be within or across the group, may be as deep as possible, and/or go as wide as possible).

Figure 2:
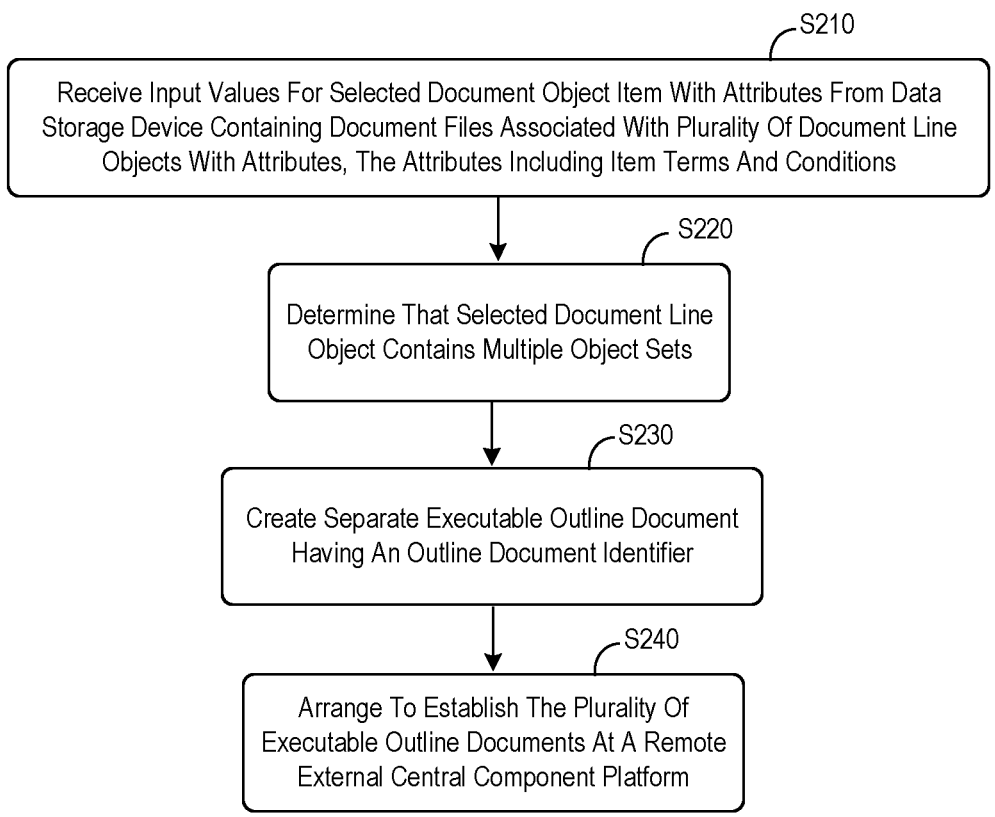
FIG. 2 is a method according to some embodiments.

FIG. 2 is a method that might performed by some or all of the elements of the system 100 described with respect to FIG. 1. The flow charts described herein do not imply a fixed order to the steps, and embodiments of the present invention may be practiced in any order that is practicable. Note that any of the methods described herein may be performed by hardware, software, or any combination of these approaches. For example, a computer-readable storage medium may store thereon instructions that when executed by a machine result in performance according to any of the embodiments described herein.

At S210, a processor of an object exchange platform may receive input values for a selected document line object with attributes from a data storage device containing document files associated with a plurality of document line objects with attributes. According to some embodiments, the attributes may include object terms and conditions (e.g., a due date and a price). The objects might comprise items and items within a selected document line item may have a hierarchical structure such that some items are sub-items of other items (and in some embodiments, the hierarchical structure has an unlimited number of levels). Note that attributes of the items within the selected document line item may be distributable and configurable in accordance with the hierarchical structure.

By way of example, items within a document line item may be associated with a plurality of geographic regions and a separate executable outline document may be created for each geographic region. Note that items within hierarchical structure maybe grouped within or across the structure when creating the plurality of executable outline documents at the remote central component platform. The attributes of the selected document line item might include, for example, a purchasing group, a purchasing organization, a company code, payment terms, a plant identifier, etc.

At S220, the processor may determine that the selected document line object contains multiple object sets. At S230, the processor may create, for each object set, a separate executable outline document having an outline document identifier. At S240, the processor may arrange to establish the plurality of executable outline documents at a remote external central component platform.

According to some embodiments, an output may provide a user interface display including information about the selected document line item and multiple item sets. For example, interaction with the user interface display might result in adjusting attributes, adding an object or item, distributing attributes, adding a term, adjusting a document period, publishing executable outline documents, etc.

An example of an implementation of the method of FIG. 2 will now be provided in connection with contracts associated with an item exchange platform (such as the ARIBA® system available from SAP AG®). In particular, the item exchange platform may support the management of contract line items that represent materials (or services) being procured from a supplier who agrees to supply the items as per terms and conditions mutually agreed to between a buyer and the supplier. To operationalize the contract, contract line items may be integrated with an external Enterprise Resource Planning ("ERP") system (such as the External Central Component® ("ECC") platform available from SAP AG®) which may allow for the creation of executable outline agreements between the buyer and the supplier.

Note that a problem may arise when the buyer would like to create multiple outline agreements from a single item exchange platform contract. Consider, for example, a Buyer company ABC, Inc. who wants to purchase 1,000 laptops. ABC, Inc. finds the best supplier who can supply them with the laptops as per their terms and conditions agreement. In this example, ABC, Inc. has four locations across the globe: the United States ("US"), Europe, India, and China. As a result, ABC, Inc would like to create four different outline agreements across the four locations (e.g., 500 laptops to the US, 250 laptops to Europe, 125 laptops to India and 125 laptops to China.

Figure 3:
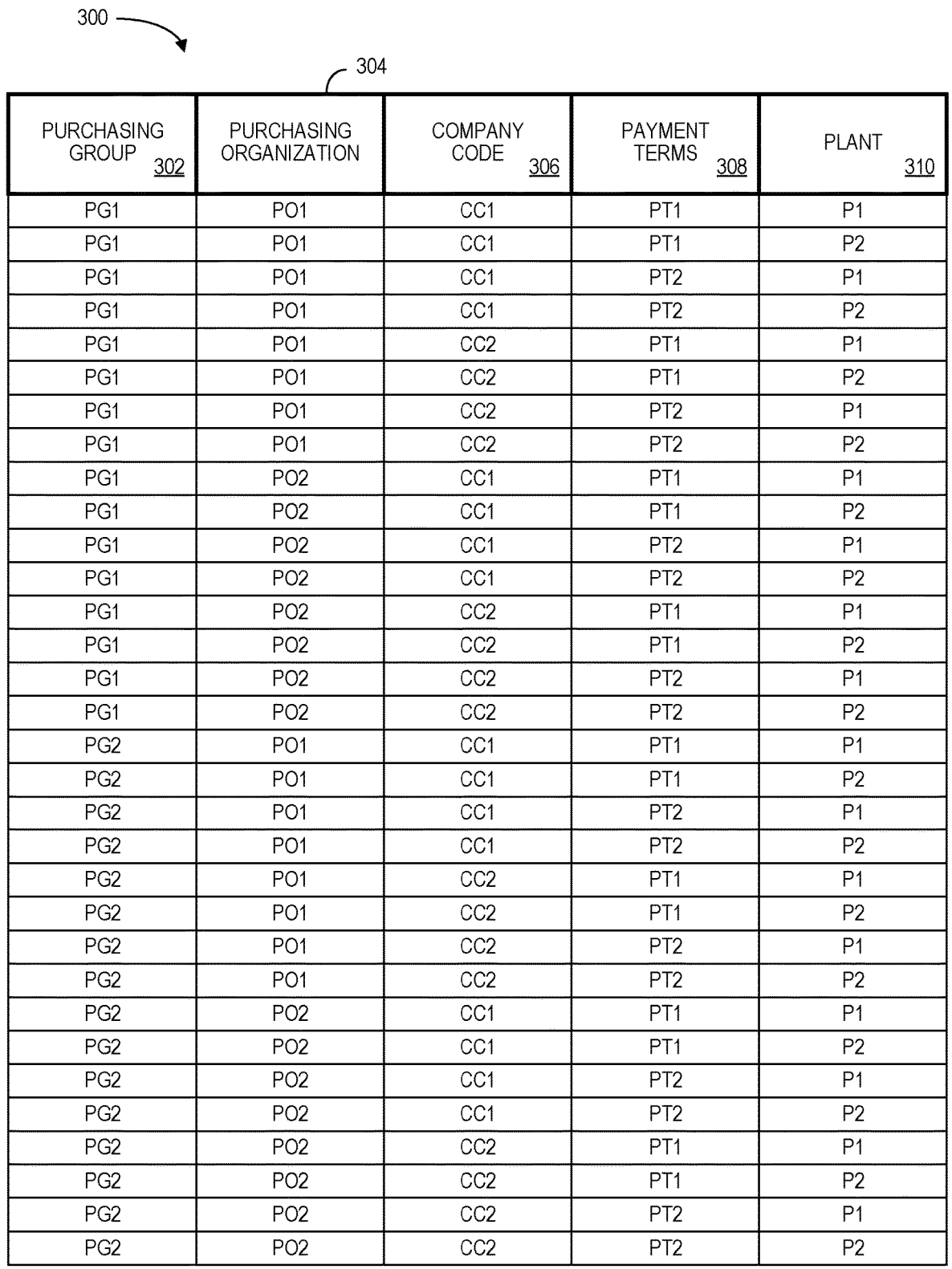
FIG. 3 is an example of a line item attribute table in accordance with some embodiments.

The criteria considered to distribute and generate the unique outline agreements may be based on contract attributes. Consider, for example, the following five attributes as illustrated in the table 300 of FIG. 3:

Purchasing Group 302,
Purchasing Organization 304,
Company Code 306,
Payment Terms 308, and
Plant 310.
With an appropriate distribution mechanism, a user may group the items based on any of the above attributes to create an outline agreement. As a result, the user can split a single item based on any of the above combinations of attribute and generate any many number of required items and integrate to an external ERP system to create outline agreement. Assume, for example, that there two unique values for each of the five attributes. Essentially, for every item the user can now create a combination of 32 outline agreements if need be as shown in the table 300. As the number of possible values for each attribute grows, the combination of outline agreements that might potentially be created by a user also grows exponentially.

Figure 4:
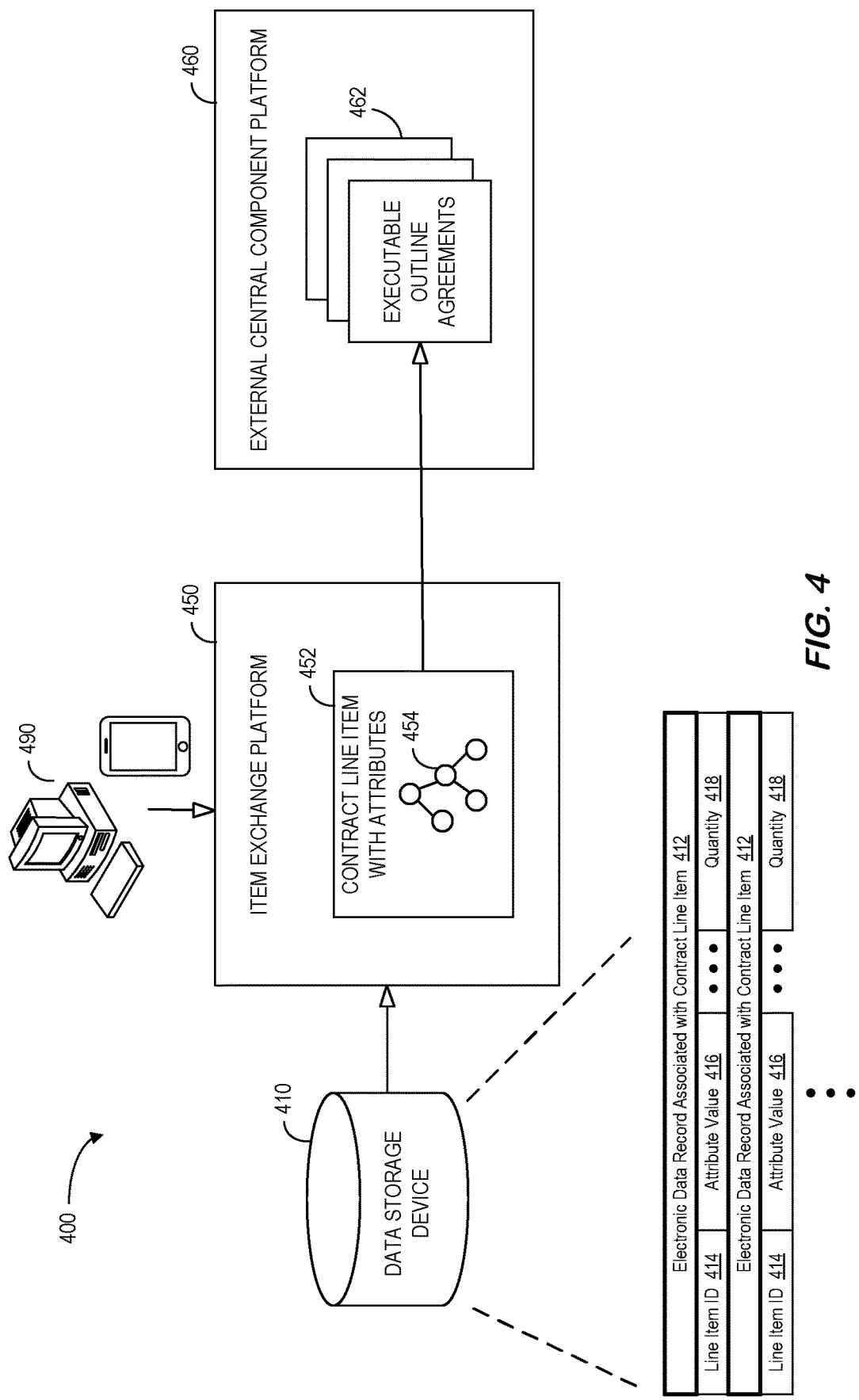
FIG. 4 is a more detailed high-level block diagram of a contract system in accordance with some embodiments.

FIG. 4 is a more detailed high-level block diagram of a contract system 400 in accordance with some embodiments. The system 400 includes an item exchange platform 450 that might be associated with a Business-to-Business ("B2B") platform that access information in a data storage device 410. For example, the data storage device might contain electronic data records associated with contract line items 412, including line item identifiers 414 and attribute values (e.g., dates, prices, quantities 418, etc.).

The item exchange platform 450 might let an enterprise manage a supply chain (including supplier relationships, transactions, etc.) and integrate the entire buying process across the organization. The item exchange platform 450 may be open to different systems and different types of goods and services, giving an enterprise innovative ways to connect with buyers and suppliers, collaborate with partners, and enhance solutions with targeted applications and extensions. In this way, the item exchange platform 450 may offer an end-to-end automated system that reduces complexity and allows buyers and suppliers to manage everything from contracts to payments using "'contract line items" and associated attributes 452. Note that a sales order or purchase order may include may different products or services, with each item being listed one after the other. As used herein, each item and its details (or attributes) is referred to as a "line item" 452. Moreover, the line items may be structured into an item hierarchy 454.

The item exchange platform 450 may communicate with an external central component platform 460 to establish executable outline agreements 462 for the line items 452 as appropriate. The external central component platform 460 might be associate with software that uses various optional modules to provide an organization with control over important business processes. The modules may communicate with each other to create an integrated solution specific for an enterprise within a wide range of industry sectors (e.g., a financial module, a Material Management ("MM") module, a sales and distribution ("SD") module, a Human Capital Management ("HCM") module, etc.).

Note that vendor selection is an important process in procurement cycle, and vendors may be selected by a quotation process. Once a vendor is short-listed by an organization, it enters into agreement to supply certain items with certain conditions. The executable outline agreements 462 may refer to, for example, a short-term or long-term purchasing agreement with a vendor. Note that executable outline agreement 462 may contain terms and conditions regarding the material that is supplied by a vendor and may be valid for a certain period of time and/or cover a certain predefined quantity or value.

A user may access the system 400 via a remote device 490 (e.g., a PC, tablet, or smartphone) to view information about and/or manage operational information in accordance with any of the embodiments described herein. In some cases, an interactive graphical user interface display may let an operator or administrator define and/or adjust certain parameters (e.g., when a new contract line item is created or attributes are adjusted) and/or provide or receive automatically generated recommendations or results from the system 400.

Figure 5:
FIG. 5 is an example of a line item and outline agreement table according to some embodiments.

According to some embodiments, logic may be provided to group hierarchical contract items to create outline agreements. Because the system may distribute a single item to create many different combinations of attributes, a robust algorithm might create only the required number of outline agreements. FIG. 5 is an example of a line item and outline agreement table 500 according to some embodiments. Although the table 500 includes twelve different items 502 (e.g., keyboards, monitors, cables) only three unique sets of attributes are present (e.g., purchasing group 502 equals "PG1," purchasing organization 504 equals "PO1," company code 506 equals "CC1," payment terms 508 equals "PT1," and plant 510 equals "P2" as illustrated by the first entry in the table 500 for a workstation mouse). Because only three unique sets of attributes are present, only three unique outline agreement identifiers 512 are required (that is, "11111," "22222," and "33333"). For example, the outline agreement identifier 512 "11111" is re-used four times in the table 500.

To achieve this, embodiments may use a map data structure that maps keys to values. The map cannot contain duplicate keys, and each key maps to a single list of items. In this example, the key represents a particular combination of all five contract attributes as identified and the value is the list of items for that combination.

Figure 6:
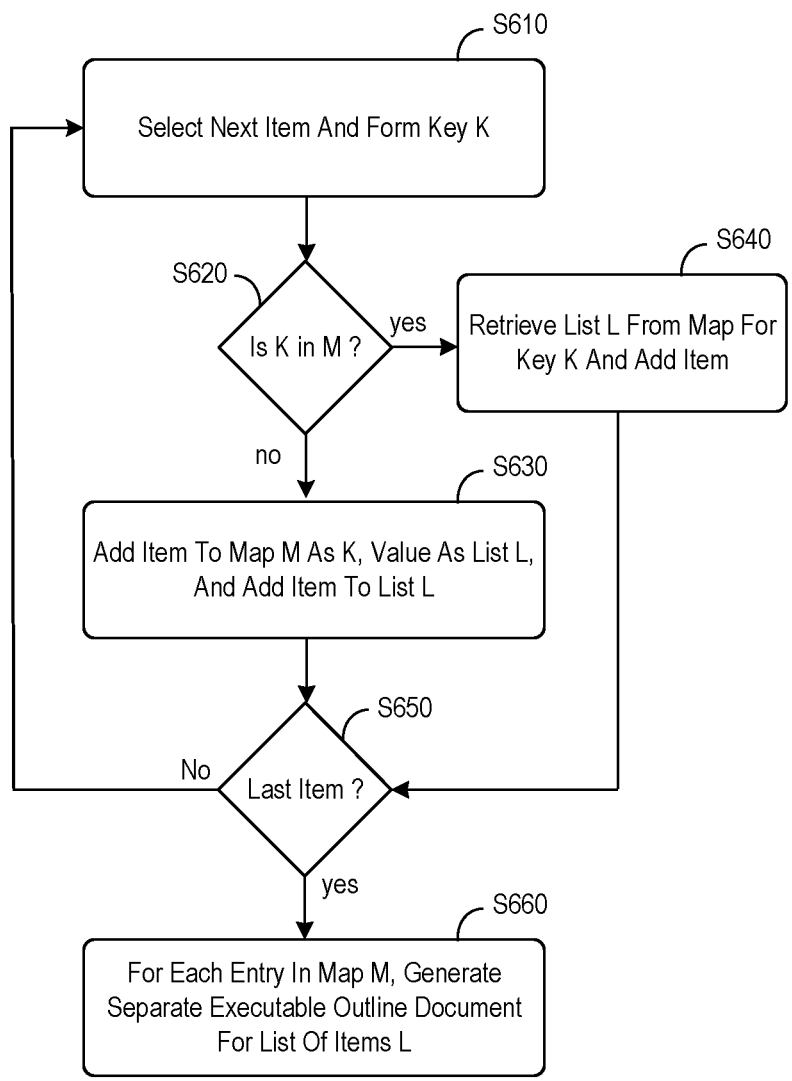
FIG. 6 is an algorithm method to populate a map and output a list of outline agreements in accordance with some embodiments.

FIG. 6 is an algorithm method to populate a map and output a list of outline agreements in accordance with some embodiments. At S610, the system selects the next item and forms a key K based on the five attributes. If K is not already in the map M at S620, the system adds the item to map M as K, adds the value as list L, and adds the item to the list L at S630. If that was not the last item in the list at S650, the process continues at S610. If K was not already in the map M at S620, the system retrieves the list L from the map for key K and adds the item at S640 (again the process may repeat at S610 until all items have been processed). In this way, the system populates a map data structure that maps keys to values, each key being associated with a list. After all items have been populated into the map data structure, for each entry in the map data structure the system generates at S660 a separate executable outline document for the list of items L.

The method of FIG. 6 can be represented by the following pseudo code algorithm (having a listed of distributed items as an input):

```
// Populate the Map M
For each item I, form a Key K which is a combination of 5 Attributes.
    If Key K does not exist in the map M, then
        Add this entry to Map with Key as K, Value as a List L
        Add Item I to the list L.
    End If
    If Key K already exists in the Map M, then
        Retrieve the List L from Map for the Key K.
        Add item I to the list L
    End If
End For Loop
// Loop through Map M and create as many as Outline Agreements
Create an empty List of OutlineAgreementIdentifiers
For each entry E in Map M
    Get the Key K and List of Items in Entry E
    Generate OutlineAgreementIdentifier for the list of items L
Add OutlineAgreementIdentifier to OutlineAgreementIdentifiers data structure
    End For Loop
Output:
    List of OutlineAgreementIdentifiers
```

Figure 7:
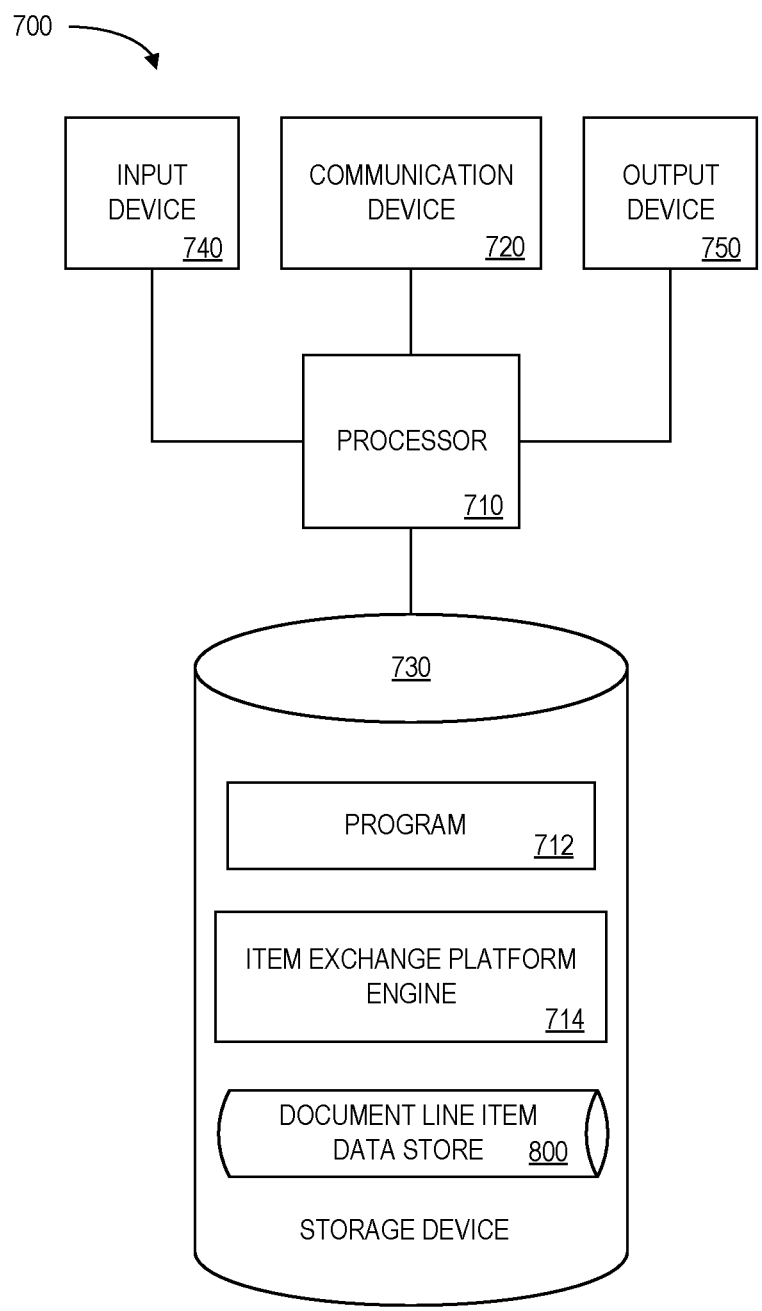
FIG. 7 is an apparatus or platform according to some embodiments.

Note that the embodiments described herein may also be implemented using any number of different hardware configurations. For example, FIG. 7 is a block diagram of an apparatus or platform 700 that may be, for example, associated with the systems 100, 400 of FIGS. 1 and 4, respectively (and/or any other system described herein). The platform 700 comprises a processor 710, such as one or more commercially available Central Processing Units ("CPUs") in the form of one-chip microprocessors, coupled to a communication device 760 configured to communicate via a communication network (not shown in FIG. 7). The communication device 760 may be used to communicate, for example, with one or more remote user platforms, central component platforms, etc. The platform 700 further includes an input device 740 (e.g., a computer mouse and/or keyboard to input item or contract information) and/an output device 750 (e.g., a computer monitor to render a display, transmit recommendations, and/or create reports about line items and outline documents). According to some embodiments, a mobile device, monitoring physical system, and/or PC may be used to exchange information with the platform 700.

The processor 710 also communicates with a storage device 730. The storage device 730 may comprise any appropriate information storage device, including combinations of magnetic storage devices (e.g., a hard disk drive), optical storage devices, mobile telephones, and/or semiconductor memory devices. The storage device 730 stores a program 712 and/or item exchange platform engine 714 for controlling the processor 710. The processor 710 performs instructions of the programs 712, 714, and thereby operates in accordance with any of the embodiments described herein. For example, the processor 710 may access data storage device that contains document files associated with a plurality of document line objects with attributes, the attributes including item terms and conditions. The processor 710 may receive input values for a selected document line object with attributes and determine that the selected document line object contains multiple object sets. The processor 710 may then create, for each object set, a separate executable outline document having an outline document identifier. The processor 710 may also arrange to establish the plurality of executable outline documents at a remote external central component platform. According to some embodiments, objects within the selected document line object have a hierarchical structure such that some objects are sub-items of other objects. Moreover, attributes of the objects within the selected document line object may be distributable and configurable in accordance with the hierarchical structure.

The programs 712, 714 may be stored in a compressed, uncompiled and/or encrypted format. The programs 712, 714 may furthermore include other program elements, such as an operating system, clipboard application, a database management system, and/or device drivers used by the processor 710 to interface with peripheral devices.

As used herein, information may be "received" by or "transmitted" to, for example: (i) the platform 700 from another device; or (ii) a software application or module within the platform 700 from another software application, module, or any other source.

In some embodiments (such as the one shown in FIG. 7), the storage device 730 further stores a document line item data store 800. An example of a database that may be used in connection with the platform 700 will now be described in detail with respect to FIG. 8. Note that the database described herein is only one example, and additional and/or different information may be stored therein. Moreover, various databases might be split or combined in accordance with any of the embodiments described herein.

Figure 8:
FIG. 8 is portion of a tabular document line item data store in accordance with some embodiments

Referring to FIG. 8, a table is shown that represents the document line item data store 800 that may be stored at the platform 700 according to some embodiments. The table may include, for example, entries identifying industrial assets or other systems to be protected. The table may also define fields 802, 804, 806, 808, 810 for each of the entries. The fields 802, 804, 806, 808, 810 may, according to some embodiments, specify: a document line item identifier 802, a description 804, attribute 1 806, attribute 2 808, and associated executable outline document identifier. The document line item data store 800 may be created and updated, for example, when new items are added to a contract, attributes are updated, etc.

The document line item identifier 802 might be a unique alphanumeric label that is associated with a particular product or service being purchased (or sold) and the description may describe the object or item. The attributes 806, 808 may include terms, conditions, dates, prices, quantities, etc. associated with the contract. The associated executable outline document identifier 810 may represent a unique string associated with an executable contract. Note that the identifier 810 "11111" is used for both "DLI_101" and "DLI_102" because they both share an identical set of attributes 808, 808 (namely, attribute 1 equals "V1" and attribute 2 equals "V3") and, as a result, only a single executable contract may be need for both objects or items (i.e., the mouse and keyboard).

Figure 9:
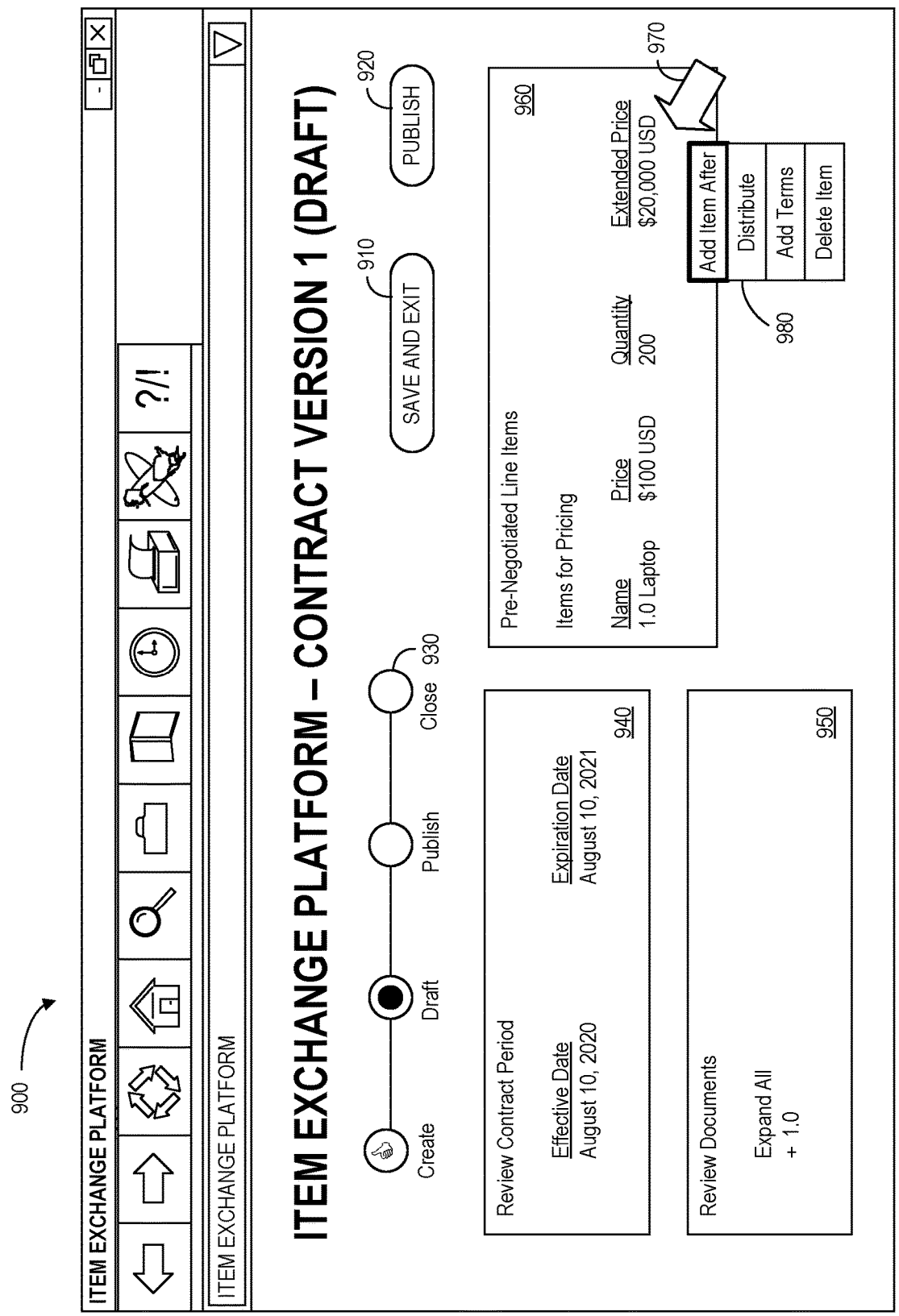
FIGS. 9 and 10 are human machine interface displays according to some embodiments.
Figure 10:
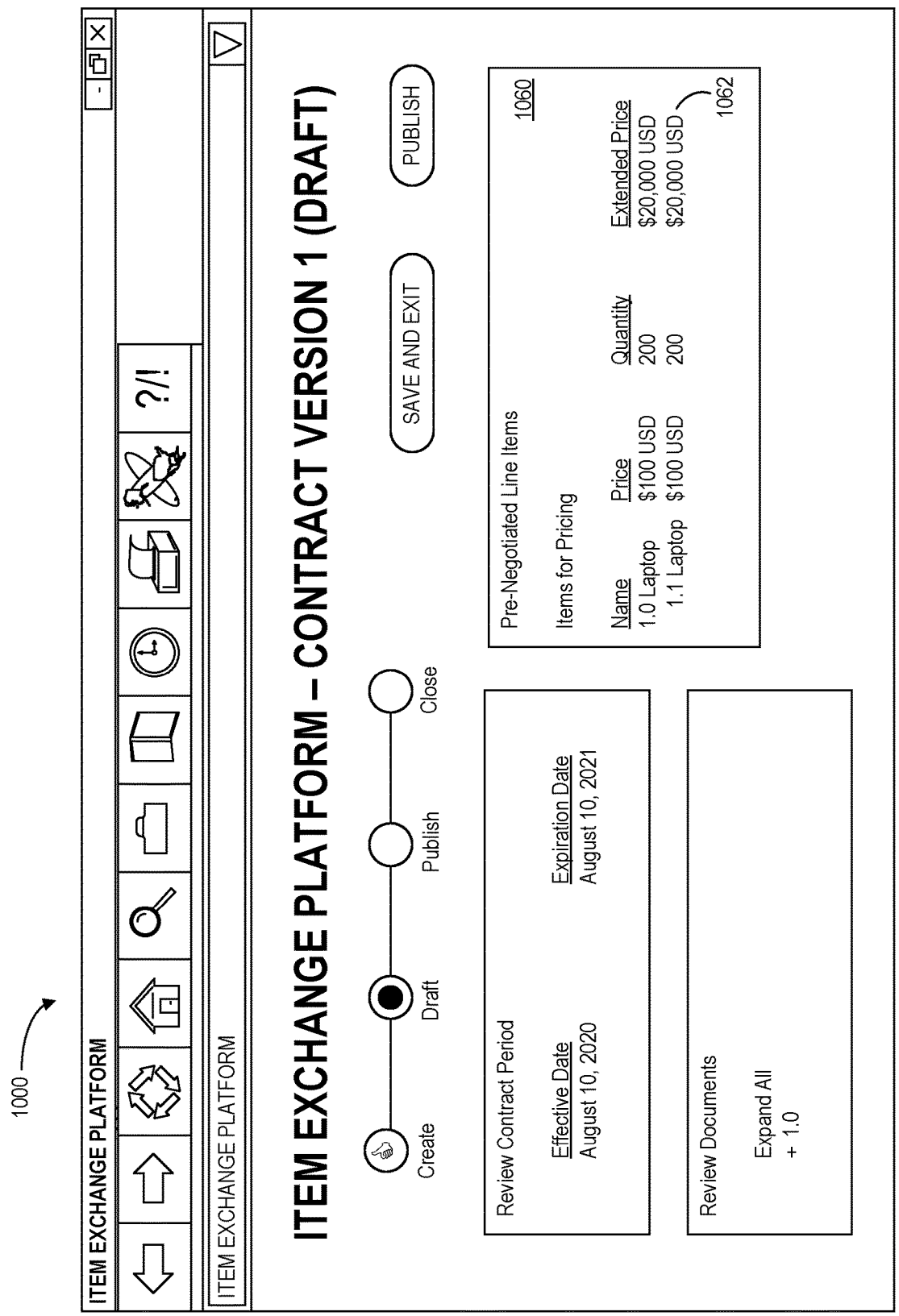

FIG. 9 is a human machine interface display 900 in accordance with some embodiments. The display 900 includes user-selectable options to "save and exit" 910 or "publish" 920 the contract. The display 900 includes a graphical progress status bar 930 showing if the contract has been created, drafted, published, or closed. A contract period area 940 displays an effective date and an expiration date for the contract, and a documents area 950 displays related documents (e.g., defining terms and conditions). A pre-negotiated line items area 960 displays the objects or item associated with the contract (e.g., including the item name, price, quantity, etc.). Selection of a line item in the area 960 (e.g., via a touch-screen or computer pointer 970) may result in display of a pop-up window containing various options (e.g., to add an item, distribute, add a term, delete the item, etc.). As shown in the display of FIG. 10, the user has selected to add a line item 960, which was inserted as "1.1 laptop" into the hierarchy. Note that in some embodiments, the inserted line item may have automatically inherited the price, quantity, etc. attribute values from the parent line item ("1.0 laptop"). When the user selects to "publish" the contract, multiple executable agreement may be established as appropriate.

Thus, embodiments may provide for the creation of multiple executable outline documents based on a single document line item in a fast, automatic, and accurate manner.

The following illustrates various additional embodiments of the invention. These do not constitute a definition of all possible embodiments, and those skilled in the art will understand that the present invention is applicable to many other embodiments. Further, although the following embodiments are briefly described for clarity, those skilled in the art will understand how to make any changes, if necessary, to the above-described apparatus and methods to accommodate these and other embodiments and applications.

Figure 11:
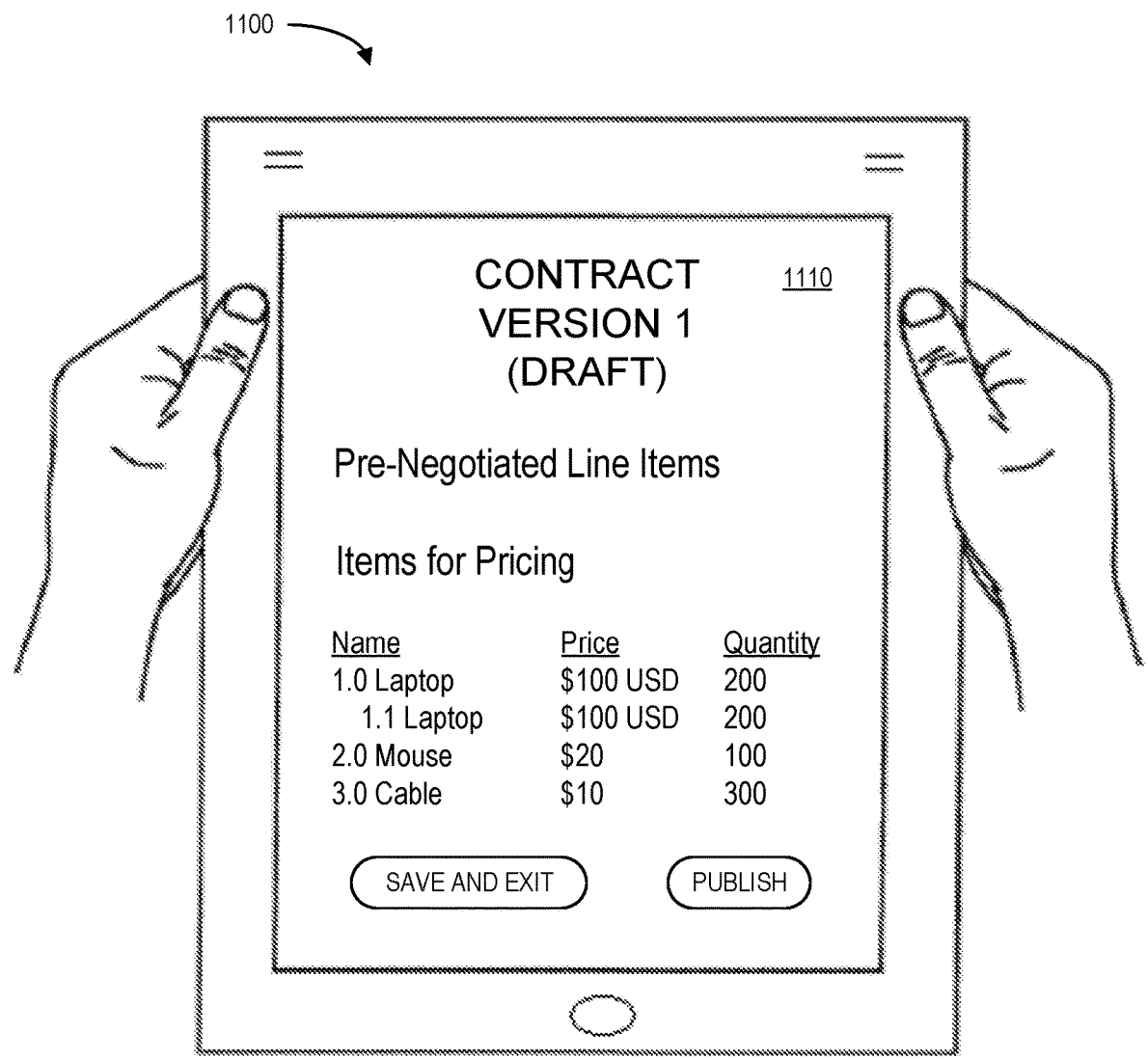
FIG. 11 illustrates a tablet computer in according with some embodiments.

Although specific hardware and data configurations have been described herein, note that any number of other configurations may be provided in accordance with some embodiments of the present invention (e.g., some of the information associated with the databases described herein may be combined or stored in external systems). Moreover, although some embodiments are focused on particular types of item and contracts, any of the embodiments described herein could be applied to other types of items and contracts. Moreover, the displays shown herein are provided only as examples, and any other type of user interface could be implemented. For example, FIG. 11 shows a tablet computer 1100 rendering a display 1110 that shows hierarchical line items with attributes that may be adjusted (e.g., via a touch-screen) and published by a user.

The present invention has been described in terms of several embodiments solely for the purpose of illustration. Persons skilled in the art will recognize from this description that the invention is not limited to the embodiments described, but may be practiced with modifications and alterations limited only by the spirit and scope of the appended claims.

The invention claimed is:

1. A system comprising:
    a data storage device containing document files associated with a plurality of document line items with terms and conditions;
    an item exchange platform processor to: (i) receive input values for a selected document line item with terms and conditions, (ii) determine that the selected document line item contains multiple item sets, (iii) create, for each item set, a separate executable outline document having an outline document identifier, and (iv) arrange to establish the plurality of executable outline documents at a remote external central component platform, wherein the creation of the plurality of separate executable outline documents comprises:
        populating a map data structure that maps keys to values, each key being associated with a list, by:
            for each item within the selected document line item, form a key K by combining multiple terms and conditions,
            if K does not already exist in the map data structure, add the item with key K as a list L,
            if K does already exist in the map data structure, add the item to appropriate list L; and
        after all items have been populated into the map data structure, for each entry in the map data structure generate a separate executable outline document for the list of items L,
    and further wherein items within the selected document line item have a hierarchical structure such that some items are sub-items of other items and terms and conditions of the items within the selected document line item are distributable and configurable in accordance with the hierarchical structure.

2. The system of claim 1, wherein the hierarchical structure has an unlimited number of levels.

3. The system of claim 1, wherein items within the document line item are associated with a plurality of geographic regions and a separate executable outline document is created for each geographic region.

4. The system of claim 1, wherein items within hierarchical structure maybe grouped within or across the structure when creating the plurality of executable outline documents at the remote central component platform.

5. The system of claim 1, further comprising:
    an output to provide a user interface display including information about the selected document line item and multiple item sets.

6. The system of claim 5, wherein interaction with the user interface display results in at least one of: (i) adjusting terms and conditions, (ii) adding an item, (iii) distributing terms and conditions, (iv) adding a term, (v) adjusting a document period, and (vi) publishing executable outline documents.

7. A non-transitory, computer readable medium having executable instructions stored therein, the medium comprising:
    instructions to receive, by a processor of an item exchange platform, input values for a selected document line item with terms and conditions from a data storage device containing document files associated with a plurality of document line items with terms and conditions;
    instructions to determine, by the processor, that the selected document line item contains multiple item sets;
    instructions to create, by the processor for each item set, a separate executable outline document having an outline document identifier; and
    instructions to arrange, by the processor, to establish the plurality of executable outline documents at a remote external central component platform, wherein the creation of the plurality of separate executable outline documents comprises:

populating a map data structure that maps keys to values, each key being associated with a list, by:
        for each item within the selected document line item, form a key K by combining multiple terms and conditions,
        if K does not already exist in the map data structure, add the item with key K as a list L,
        if K does already exist in the map data structure, add the item to appropriate list L; and
    after all items have been populated into the map data structure, for each entry in the map data structure generate a separate executable outline document for the list of items L, and further wherein items within the selected document line item have a hierarchical structure such that some items are sub-items of other items and terms and conditions of the items within the selected document line item are distributable and configurable in accordance with the hierarchical structure.

8. The medium of claim 7, wherein the hierarchical structure has an unlimited number of levels.

9. The medium of claim 7, wherein items within the document line item are associated with a plurality of geographic regions and a separate executable outline document is created for each geographic region.

10. The medium of claim 7, wherein items within hierarchical structure maybe grouped within or across the structure when creating the plurality of executable outline documents at the remote central component platform.

11. A computer-implemented method comprising:

receiving, by a processor of an item exchange platform, input values for a selected document line item with terms and conditions from a data storage device containing document files associated with a plurality of document line items with terms and conditions;
    determining, by the processor, that the selected document line item contains multiple item sets;
    creating, by the processor for each item set, a separate executable outline document having an outline document identifier; and
    arranging, by the processor, to establish the plurality of executable outline documents at a remote external central component platform, wherein the creation of the plurality of separate executable outline documents comprises:

populating a map data structure that maps keys to values, each key being associated with a list, by:
            for each item within the selected document line item, form a key K by combining multiple terms and conditions,
            if K does not already exist in the map data structure, add the item with key K as a list L,
            if K does already exist in the map data structure, add the item to appropriate list L; and
        after all items have been populated into the map data structure, for each entry in the map data structure generate a separate executable outline document for the list of items L, and further wherein items within the selected document line item have a hierarchical structure such that some items are sub-items of other items and terms and conditions of the items within the selected document line item are distributable and configurable in accordance with the hierarchical structure.

12. The method of claim 11, further comprising:

an output to provide a user interface display providing information about the selected document line item contains multiple item sets.

13. The method of claim 12, wherein interaction with a user interface display results in at least one of: (i) adjusting terms and conditions, (ii) adding an item, (iii) distributing terms and conditions, (iv) adding a term, (v) adjusting a document period, and (vi) publishing executable outline documents.

\* \* \* \* \*